United States Patent [19]
Juby et al.

[11] 3,872,122

[45] Mar. 18, 1975

[54] 11 H-PYRIMIDO[4,5-b][1,4]BENZODIAZEPINES

[75] Inventors: Peter Frederick Juby, Jamesville; Thomas William Hudyma, Manlius, both of N.Y.

[73] Assignee: Bristol-Myers Company, New York, N.Y.

[22] Filed: Apr. 16, 1973

[21] Appl. No.: 351,217

[52] U.S. Cl.................260/256.4 F, 260/256.4 C, 260/256.4 N, 424/251
[51] Int. Cl............................................ C07d 57/02
[58] Field of Search............................ 260/256.4 F

[56] References Cited
OTHER PUBLICATIONS

Yoneda et al. Chem. Abstracts, vol. 77(1972), page 396.

*Primary Examiner*—James A. Patten
*Attorney, Agent, or Firm*—Robert E. Havranek

[57] ABSTRACT

Appropriately substituted 11H-pyrimido[4,5-b]-[1,4]benzodiazepines have shown biological activity, e.g., anti-hypoxic, hypothermic, antipyretic and anti-inflammatory. An example of a potent anti-hypoxic agent is 5,6-dihydro-11-methyl-11H-pyrimido[4,5-b][1,4]-benzodiazepine.

4 Claims, No Drawings

11H-PYRIMIDO[4,5-B][1,4]BENZODIAZEPINES

BACKGROUND OF THE INVENTION

1. Field of the Invention

This invention relates to a series of 11H-pyrimido[4,5-b][1,4]benzodiazepines which show anti-hypoxic, hypothermic, anti-pyretic and anti-inflammatory activity.

2. Description of the Prior Art

A. E. C. Taylor and F. Yoneda, *Angew. Chem.* (International Ed. English) 6, 878 (1967) reported the preparation of the compound having the formula

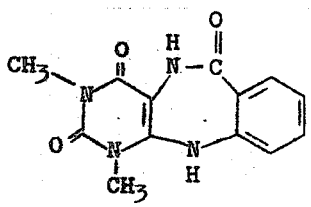

No biological data was reported.

B. K. J. M. Andrews and B. P. Tong, *J. Chem. Soc.*, 1753 (1968) reported the preparation of the compound having the formula

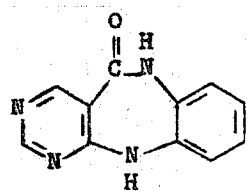

No biological data was reported.

C. G. Schmidt, German Patent No. 1,205,106 (1965) reports the compounds having the formula

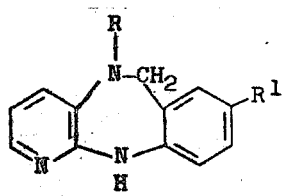

in which R and $R^1$ and H or alkyl, as possessing antipyretic activity.

D. G. Schmidt, German Patent No. 1,204,680 (1965); G. Schmidt, U. S. Pat. No. 3,406,168 (1968); K. Thomae, French Patent No. 1,531,328 (1968) and G. Schmidt et al., S. African Patent No. 68/05,942 (1969) all report the compound having the general formula

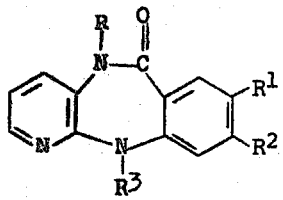

in which R is H, alkyl or alkylaminomethyl; $R^1$ is H or methyl; $R^2$ is H or Cl; and $R^3$ is H or alkyl as possessing antipyretic, anti-inflammatory, analgetic and sedative activity.

E. R. E. Strube, U. S. Pat. No. 3,291,790 (1966) describes the preparation of the compound having the formula

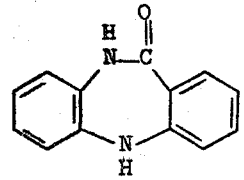

F. W. E. Coyne and J. W. Cusic, *J. Med. Chem.*, 10, 541 (1967) describe the preparation of the compound of having the formula

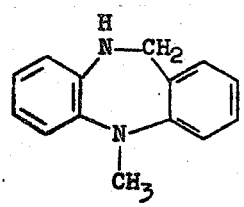

G. A. Wander, British Patent No. 961,106 (1964) describes the antidepressant having the formula

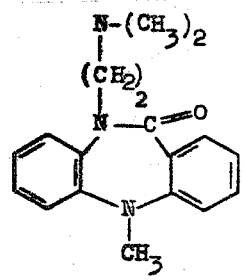

SUMMARY

Compounds having the formula

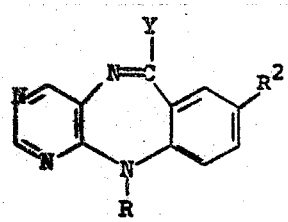

Ia and

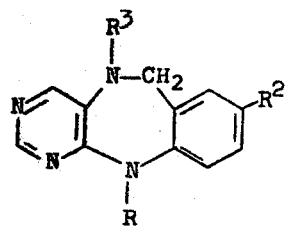

Ib in which Y is di(lower)alkylamino, cyclo (lower)-alkylamino, benzylamino, phenethylamino, or di(-lower)-alkylamino (lower)alkylamino; R and R³ are alike or different and are H, (lower)alkyl or a radical of the formula

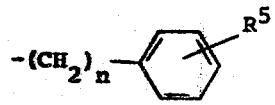

in which $n$ is an integer of 1 to 4 and $R^5$ is chloro, H, $CF_3$, fluoro, bromo, (lower)alkoxy or (lower)alkyl, $R^2$ is H, chloro, bromo, fluoro, $CF_3$, (lower)alkyl, (lower)alkoxy or nitro; or a pharmaceutically acceptable nontoxic salt thereof are useful compounds having biological activity.

Full Disclosure

The new and novel compounds of the instant invention are compounds possessing useful activities as anti-hypoxic, hypothermic, antipyretic or anti-inflammatory agents. These compounds are represented by the compounds having the structures

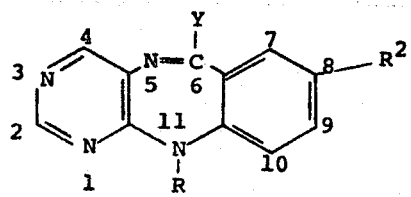

and

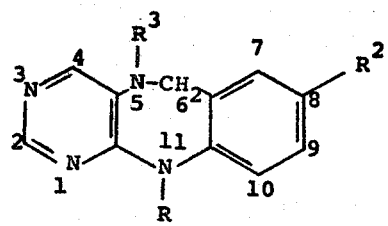

in which Y is di(lower)alkylamino, cyclo (lower) alkyl-amino, benzylamino, phenethylamino, or di (lower)al-kylamino (lower)alkylamino; R and R³ are alike or different and are H, (lower)alkyl or a radical of the formula

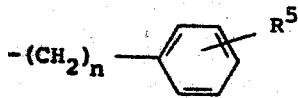

in which $n$ is an integer of 1 to 4 and $R^5$ is H, $CF_3$, chloro, fluoro, bromo, (lower)alkoxy or (lower) alkyl, $R^2$ is H, chloro, bromo, $CF_3$, fluoro, (lower)-alkyl, (lower)alkoxy or nitro; or a pharmaceutically acceptable nontoxic salt thereof.

For the purpose of this disclosure, the term "(lower)," as in (lower)alkyl, shall mean a straight or branched chain hydrocarbon of 1 to 6 carbons. The term "pharmaceutically acceptable nontoxic salt" shall mean an acid salt prepared by the reaction of one mole of a compound of formula Ia or Ib with one or more moles of a pharmaceutically acceptable nontoxic acid such as sulfuric, hydrochloric, hydrobromic, malic, maleic, citric, ascorbic, nitric, phosphoric or acetic acid, or some other functionally equivalent acid, to form a mono- or poly acid salt.

Anti-hypoxic activity is defined here as the property of a compound to prolong the survival time of mammals in a low oxygen atmosphere. Hypothermic activity is the property of a compound to lower the normal body temperature of a mammal. Antipyretic activity is the property of a compound to lower the elevated body temperature of a diseased mammal. Anti-inflammatory activity is the property of a compound to reduce the inflammation associated with physical trauma, arthritis, etc. Some of the compounds of the instant invention possess marginal anti-inflammatory activity. All of the compounds possess some activity as anti-hypoxic, antipyretic or hypothermic agents.

The compounds of the instant invention are prepared by one of two synthetic routes, the general scheme of which are diagrammed below:

Scheme I

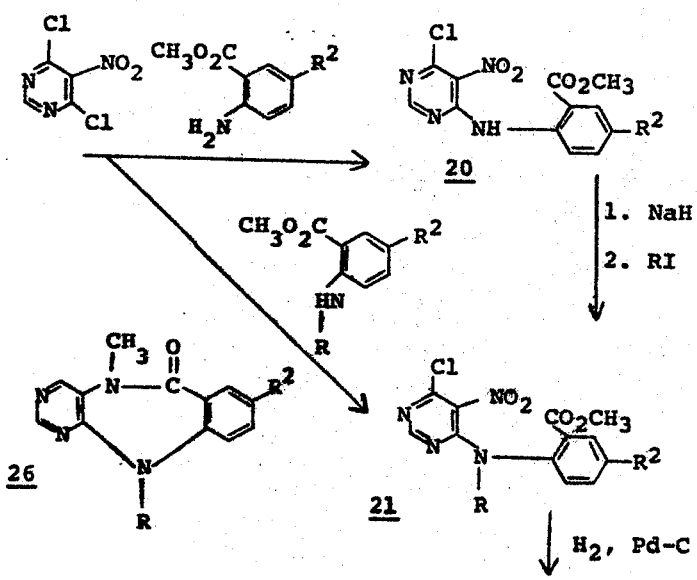

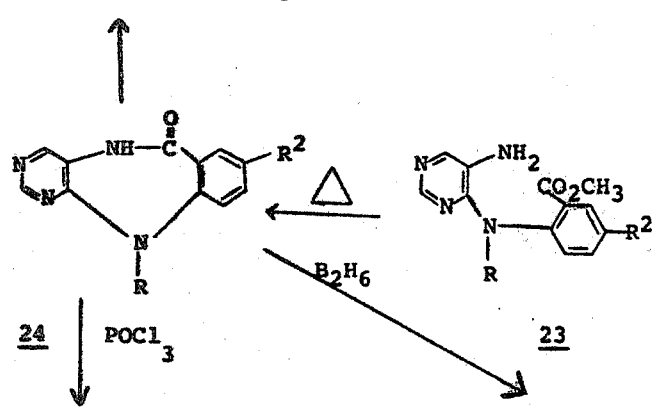
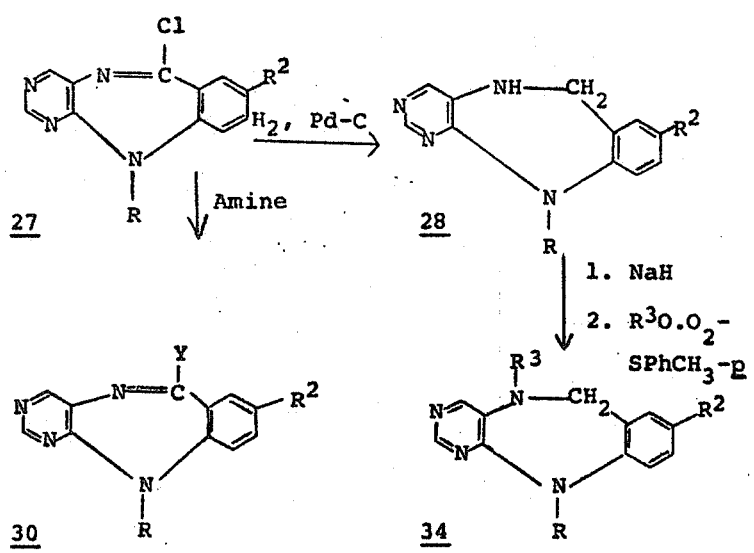
R, R², R³ and Y are as defined above.
Where R = H in 23, the conversion to 24 fails because a tautomeric form (23a) of 23 cyclizes instead to the pyrimido [4,3-b][1,4]quinazol-10-one (50).
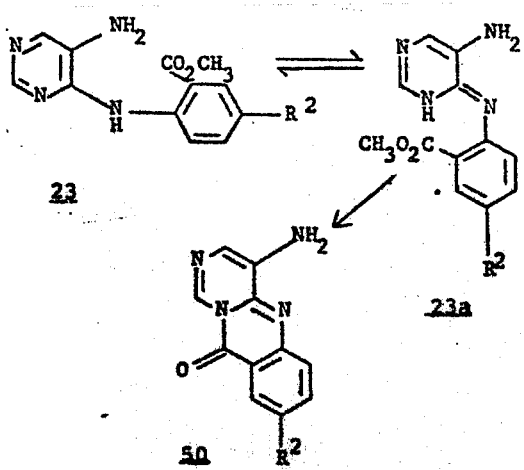

Scheme II

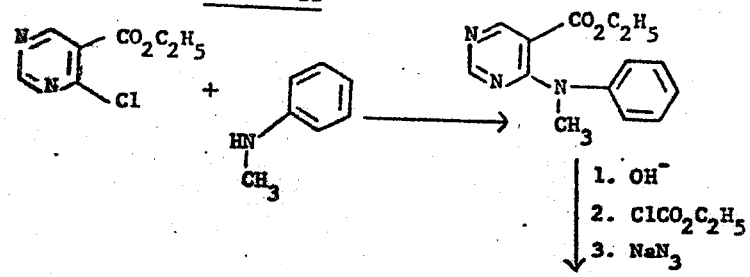

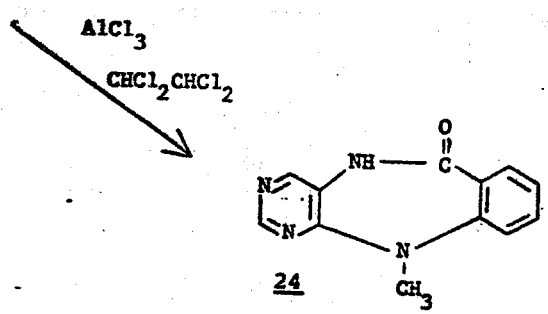

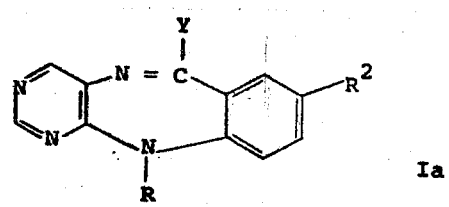

A preferred embodiment of the present invention is the compound having the formula

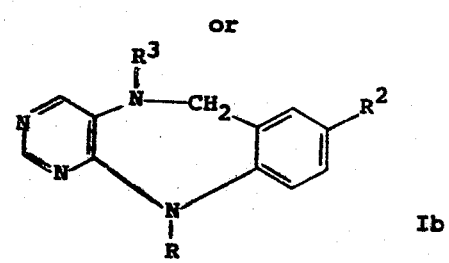

in which Y is di(lower)alkylamino, cyclo(lower)-alkylamino, benzylamino, phenethylamino, or di(-lower)-alkylamino (lower)alkylamino; R and R³ are alike or different and are H, (lower)alkyl or a radical of the formula

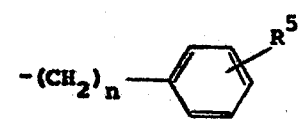

in which $n$ is an integer of 1 to 4 and $R^5$ is chloro, $CF_3$, H, fluoro, bromo, (lower)alkoxy or (lower)alkyl; $R^2$ is H, chloro, bromo, fluoro, (lower)alkyl, $CF_3$, (lower)alkoxy or nitro; or a pharmaceutically acceptable non-toxic salt thereof.

Another preferred embodiment is the compound having the formula

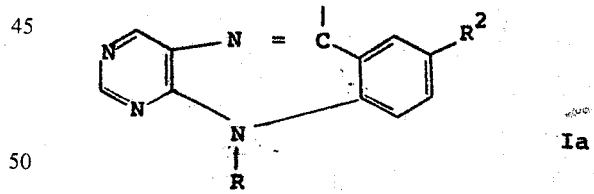

in which Y is di(lower)alkylamino, cyclo(lower)-alkylamino, benzylamino, phenethylamino, or di(-lower)-alkylamino (lower)alkylamino; R is H, (lower-)alkyl or a radical of the formula

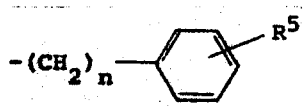

in which $n$ is an integer of 1 to 4 and $R^5$ is chloro, $CF_3$, H, fluoro, bromo, (lower)alkoxy or (lower)alkyl, $R^2$ is H, chloro, bromo, fluoro, (lower)alkyl, $CF_3$ (lower)alkoxy or nitro; or a pharmaceutically acceptable non-toxic salt thereof.

A more preferred embodiment is the compound of formula Ia wherein R is H, (lower)alkyl, benzyl or phenethyl, R² is H, and Y is dimethylamino, cyclopropylamino, benzylamino or dimethylaminoethylamino; or a pharmaceutically acceptable, nontoxic salt thereof.

Another more preferred embodiment is the compound of formula Ia wherein R is methyl, R² is H and Y is dimethylamino, cyclopropylamino, benzylamino or dimethylaminoethylamino; or a pharmaceutically acceptable, nontoxic salt thereof.

A preferred embodiment of the present invention is the compound having the formula

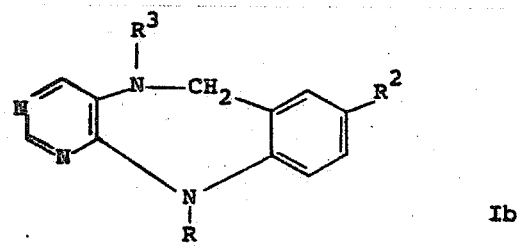

Ib in which R and R³ are alike or different and are H, (lower)alkyl or a radical of the formula

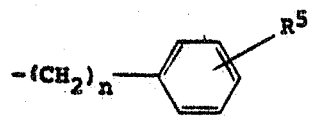

in which n is an integer of 1 to 4 and R⁵ is chloro, CF₃, H, fluoro, bromo, (lower)alkoxy or (lower)alkyl. R² is H, chloro, bromo, fluoro, (lower)alkyl, CF₃, (lower)alkoxy or nitro; or a pharmaceutically acceptable nontoxic salt thereof.

A more preferred embodiment is the compound of formula Ib wherein R is H, (lower)alkyl, benzyl or phenethyl, R² is H or chloro, and R³ is H, (lower)-alkyl, benzyl or phenethyl; or a pharmaceutically acceptable, nontoxic salt thereof.

Another more preferred embodiment is the compound of formula Ib wherein R is methyl or benzyl, R² is H or chloro and R³ is H or methyl; or a pharmaceutically acceptable, nontoxic salt thereof.

Most preferred embodiments are the compounds of formula Ib wherein

A. R² is H, R is benzyl and R³ is H;
B. R² is chloro, R and R³ are methyl;
C. R² and R³ are H and R is methyl;
D. R² is chloro, R³ is H and R is methyl; and
E. R and R³ are methyl and R² is H;
F. R, R² and R³ are H.

Another most preferred embodiment is the compound of formula Ia wherein Y is cyclopropylamino, R is methyl and R² is H.

The compunds are screened for the pharmacological properties by the following standard procedures:

Mouse Hypoxia Survival Time

An incubator was adapted for use as a hypoxia chamber allowing continuous visualization of 12 mice housed individually within the chamber. Six mice are treated intraperitoneally with the test drug and six control mice are treated with the drug vehicle. Approximately 20–30 minutes later a commercially prepared 3% oxygen in nitrogen mixture is flushed through the chamber for 15 min at a flow rate of 55 cubic feet/min. At the end of 15 min the flow rate is reduced to 5 cubic feet/min.

The precise time to death in minutes for each mouse is obtained and the mean survival time ± 1 Standard error calculated for each group. A greater than 50% increase in survival time is the level of significance. During the above procedure the partial pressure of oxygen within the chamber is continuously monitored.

Hypothermic Activity

In conjunction with hypoxia testing, observations are made on the effect of the test agents on body temperature. Rectal temperatures are measured by means of a thermistor temperature probe (Yellow Springs Instrument Co.) in both the vehicle and drug treated groups of mice. Approximately 20–30 minutes later rectal temperatures are retaken. Changes in the normal body temperature of 2°C or above are considered the level of significance in this test.

Antipyretic Activity

This test refers to the ability of a drug to reduce an elevated body temperature rather than reducing a normal body temperature. The elevated body temperature is generally induced by injecting yeast organisms or endotoxin.

Table I

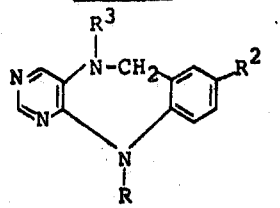

| Compound No. | R² | R | R³ | Anti-Hypoxic Activity* | | Hypothermic Activity+ | | Antipyretic Activity** |
| | | | | Dose mg/kg | % Change in Survival Time | Dose mg/kg | °C | MED, mg/kg |
|---|---|---|---|---|---|---|---|---|
| 42 | H | C₆H₅CH₂ | H | 10 | 81 | 10 | −2.4 | |
| | | | | 30 | 24 | 30 | −3.2 | |
| 44 | Cl | CH₃ | CH₃ | 10 | 81 | 10 | −3.5 | |
| | | | | 30 | 84 | 30 | −3.1 | |
| 28 | H | CH₃ | H | 10 | 178 | 10 | −3.9 | 8 |
| | | | | 30 | 138 | 30 | −3.5 | |
| | | | | 3 | 10 | 3 | −0.6 | |
| 29 | Cl | CH₃ | H | 10 | 87 | 10 | −3.8 | |
| | | | | 30 | 30 | 30 | −3.2 | |

—Continued

| Compound No. | R² | R | R³ | Anti-Hypoxic Activity* | | Hypothermic Activity+ | | Antipyretic Activity** |
|---|---|---|---|---|---|---|---|---|
| | | | | Dose mg/kg | % Change in Survival Time | Dose mg/kg | °C | MED, mg/kg |
| 34 | H | CH₃ | CH₃ | 10 | 31 | 10 | −0.9 | |
| | | | | 30 | 84 | 30 | −5.0 | |
| 52 | H | H | H | 10 | — | 10 | — | |
| | | | | 30 | 105 | — | — | |

*Dosed i.p. in mice. A change in survival time of >50% is considered significant.
+Dosed i.p. in mice. A drop in temperature of >2° is considered significant.
**Dosed p.o. in rats.

Table II

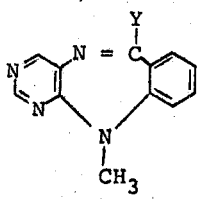

| Compound No. | Y | Dose mg/kg | Anti-Hypoxic Activity* % Change in Survival Time | Hypothermic Activity+ ° C |
|---|---|---|---|---|
| 30 | (CH₃)₂N | 20 | 0 | −2.7 |
| 31 | ▷−NH | 30 | 41 | −3.2 |
| 32 | PhCH₂NH | 30 | 0 | −2.7 |
| 33 | (CH₃)₂N(CH₂)₂NH | 30 | 0 | −2.6 |

*Dosed i.p. in mice. A change in survival time of >50% is considered significant.
+Dosed i.p. in mice. A drop in temperature of >2° is considered significant.

The compunds of the instant invention are useful for their anti-hypoxic, hypothermic and antipyretic activity in mammals, including man. They are potentially useful to lower tissue oxygen requirements during surgery, in cardiac disorder situations and, perhaps, in space travel where oxygen consumption can be critical. The dosage range of the compounds is about 1 to 30 mg./kg., one to six times a day.

EXAMPLES OF THE PREFERRED EMBODIMENTS

EXAMPLE 1

Preparation of Methyl N-(6-Chloro-5-nitro-4-pyrimidinyl)anthranilate (20)

A solution of 4,6-dichloro-5-nitropyrimidine (1.0 g, 0.00515 mole), methyl anthranilate (0.78 g, 0.00515 mole) and triethylamine (0.52 g, 0.00515 mole) in benzene (8 ml) was heated under reflux for 0.5 hour. The reaction mixture was cooled to 23° and filtered. The filtrate was concentrated to give a brown, gummy solid which was extracted with boiling cyclohexane. From the cooled extract was obtained a yellow crystalline solid (0.53 g, 33%), mp 140°–143°. The solid was recrystallized twice from cyclohexane to give methyl N-(6-chloro-5-nitro-4-pyrimidinyl)anthranilate, mp 144°–145°.

Anal. Calcd for $C_{12}H_9ClN_4O_4$: C, 46.69; H, 2.94; Cl, 11.49; N, 18.15. Found: C, 46.76; H, 2.97; Cl, 11.38; N, 18.10.

EXAMPLE 2

Preparation of Methyl N-(6-Chloro-5-nitro-4-pyrimidinyl)-N-methylanthranilate (21)

Method A — Sodium hydride (0.311 g of a 50% sodium hydride dispersion in mineral oil, 0.00648 mole sodium hydride) was added to a cooled (ice-water), stirred suspension of methyl N-(6-chloro- 5-nitro-4-pyrimidinyl)anthranilate (2.0 g, 0.00648 mole) in DMF [dimethylformamide (10 ml)].

Stirring was continued for 1 hour. Methyl iodide (3ml) was then added and stirring was continued for 16 hours while the temperature of the reaction mixture was allowed to slowly rise to room temperature. The reaction mixture was concentrated to leave a viscous residue which was washed with Skellysolve B (petroleum ether, essentially n-hexane) and then extracted with boiling cyclohexane. The extract was reduced in volume. From the cooled extract was obtained a yellow crystalline solid (1.18 g, 56.5%), mp 134.5°–135.5°. The solid was recyrstallized from cyclohexane to give methyl N-(6-chloro-5-nitro-4-pyrimidinyl)-N-methylanthranilate as yellow needles, mp 136°–137.5°.

Anal. Calcd for $C_{13}H_{11}ClN_4O_4$: C, 48.38; H, 3.44; Cl, 10.99. Found: C, 48.15; H, 3.74; Cl, 10.72.

Method B. — A mixture of 4,6-dichloro-5-nitropyrimidine (5.0 g, 0.0258 mole) and methyl N-methylanthranilate (8.53 g, 0.0516 mole) in benzene (100 ml) was heated under reflux for 5 hours. The cooled solution was washed with water and concentrated. The semi-solid residue was recrystallized from cyclohexane to give methyl N-(6-chloro-5-nitro-4-pyrimidinyl)-N-methylanthranilate (5.36 g, 64.6%), mp 133.5°–135.5°.

EXAMPLE 3

Preparation of Methyl 5-Chloro-N-(6-chloro-5-nitro-4-pyrimidinyl)-N-methylanthranilate (22)

A solution of 4,6-dichloro-5-nitropyrimidine (1.99 g, 0.01025 mole) and methyl 5-chloro-N-methylanthranilate (4.08 g, 0.0205 mole) in toluene (50 ml) was heated under reflux for 7 hours and then allowed to stand at 25° for 19 hours. The mixture was filtered and the filtrate concentrated. The residue was crystallized from Skellysolve B to give methyl 5-chloro-N-(6-chloro-5-nitro-4-pyrimidinyl)-N-methylanthranilate (1.65 g, 45%), mp 104°–107°. Recrystallization from Skellysolve B gave orange-yellow crystals, mp 107°–108°.

Anal. Calcd for $C_{13}H_{10}Cl_2N_4O_4$: C, 43.72; H, 2.82; Cl, 19.85; N, 15.69. Found: C, 44.04; H, 2.97; Cl, 19.55; N, 15.73.

EXAMPLE 4

Preparation of Methyl N-(5-Amino-4-pyrimidinyl)-N-methylanthranilate (23)

A solution of methyl N-(6-chloro-5-nitro-4-pyrimidinyl)-N-methylanthranilate (12.2 g, 0.0378 mole) and triethylamine (4.21 g, 0.0416 mole) in ethyl acetate (300ml) containing 10% Pd-C (3.0 g) was shaken with hydrogen at an initial pressure of 3.5 kg/cm² until the uptake of hydrogen ceased. The reaction mixture was filtered. The collected solid was well washed with hot ethyl acetate. The combined filtrate and washings was reduced to dryness to give methyl N-(5-amino-4-pyrimidinyl)-N-methylanthranilate (9.0 g, 92%), mp 118°–122°. A portion of the product was recyrstallized from ethyl acetate to give pale yellow crystals, mp 121.5°–123.5°.

Anal. Calcd for $C_{13}H_{14}N_4O_2$: C, 60.45; H, 5.46; N, 21.70. Found: C, 60.41; H, 5.60; N, 21.99.

EXAMPLE 5

Preparation of 11-Methyl-11H-pyrimido[4,5-b][1,4]benzodiazepin-6(5H)-one (24)

A flask containing methyl N-(5-amino-4-pyrimidinyl)-N-methylanthranilate (7.8 g) was placed in an oil bath maintained at 165° for 10 minutes. The solid product was extracted and recrystallized from ethanol to give 11-methyl-11H-pyrimido[4,5-b][1,4]-benzodiazepin-6(5H)-one (5.6 g, 82%), mp 282°–284°. A portion of the product was sublimed at 138° (0.7 mm Hg) to give pale yellow crystals, mp 282°–284°.

Anal. Calcd for $C_{12}H_{10}N_4O$: C, 63.70; H, 4.46; N, 24.77. Found: C, 63.96; H, 4:64; N, 24.94.

EXAMPLE 6

Preparation of 8-Chloro-11-methyl-11H-pyrimido [4,-5-b][1,4]benzodiazepin-6(5H)-one(25)

A mixture of methyl 5-chloro-N-(6-chloro-5-nitro-4-pyrimidinyl)-N-methylanthranilate (10.7 g, 0.03 mole), triethylamine (4.2 ml. 0.03 mole), and 10% Pd-C (3.0 g) in ethyl acetate (200 ml) was shaken with hydrogen at an initial pressure of 3.5 kg/cm² until four equivalents of hydrogen had been consumed. The mixture was filtered and the filtrate concentrated. The residual oil was heated on a steam bath for 0.5 hours and then heated, at a pressure of 0.05 mm, by means of an oil bath maintained at 220° for 1 hour. Part of the product was purified by sublimation at 250° (0.05 mm) to give yellow crystals, mp 303°–310°, and part was purified by recrystallization from n-butyl alcohol to give light brown crystals, mp 314°–318°. The two fractions (4.7 g, 60%) were recrystallized from n-butyl alcohol to give 8-chloro-11-methyl11H-pyrimido [4,5-b][1,4] benzodiazepin-6(5H)-one as pale yellow crystals, mp 318°–320°.

Anal. Calcd for $C_{12}H_9ClN_4O$: C, 55,29; H, 3.48; Cl, 13.60; N, 21.49. Found: C, 55.53; H, 3.68; Cl, 13.45; N, 21.71.

EXAMPLE 7

Preparation of 5,11-Dimethyl-11H-pyrimido[4,5-b][1,4]benzodiazepin-6(5H)-one Hydrochloride (26)

Sodium hydride (0.716 g of a 57% sodium hydride dispersion in mineral oil, 0.017 mole of sodium hydride) was added to a stirred, cooled (ice-water) mixture of 11-methyl-11H-pyrimido-[4,5-b][1,4]-benzodiazepin-6(5H)-one (3.51 g, 0.0155 mole) in DMF (40 ml) under nitrogen. The mixture was stirred for 0.75 hour at 25°. The resulting solution was cooled (ice-water) and a solution of methyl p-toluenesulfonate (3.17 g, 0.017 mole) in DMF (8 ml) was added over a period of 5 minutes. The mixture was heated by means of an oil bath maintained at 105° for 2.5 hours. The reaction mixture was concentrated and the residue partitioned between ether and water. The ether layer was dried ($Na_2SO_4$) and concentrated to give a yellow oil. The aqueous layer was concentrated and the residue extracted with benzene. The benzene extract was concentrated to give a red oil. The yellow and red oils were chromatographed on silicic acid with toluene-acetone (8:1) to give an oil (2.85 g) which was treated with hydrogen chloride in ether. The resulting solid (3.1 g, 72%) was recrystallized from ethanol-ether to give 5,1-1-dimethyl-11H-pyrimido[4,5-b][1,4] benzodiazepin-6(5H)-one hydrochloride as pale yellow crystals, mp 214°–223° (decomp).

Anal. Calcd for $C_{13}H_{12}N_4O·HCl$: C, 56,42; H, 4.74; Cl, 12.81. Found: C, 56.16; H, 4.92; Cl, 13.01.

EXAMPLE 8

Preparation of 6-Chloro-11-methyl-11H-pyrimido[4,5-b][1,4]benzodiazepine (27)

A mixture of 11-methyl-11H-pyrimido[4,5-b][1,4]benzodiazepin-6(5H)-one (2.0g) and POCl$_3$ (20 ml) was heated under reflux for 2.5 hours. The reaction mixture was concentrated and a CH$_2$-Cl$_2$ solution of the residue poured onto ice. The mixture was neutralized with K$_2$CO$_3$. The CH$_2$Cl$_2$ layer was washed with cold aqueous K$_2$CO$_3$ followed by cold water, dried (Na$_2$SO$_4$), and reduced to dryness. The residue (1.5g) was chromatographed on alumina (25 g) with benzene-acetone (1:1) to give 6-chloro-11-methyl-11H-pyrimido[4,5-b][1,4]-benzodiazepine (0.93 g, 43%), mp 125°–126°. The product was recrystallized from Skellysolve B and then sublimed at 80°–110° (0.02 mm Hg) to give yellow crystals, mp 126°–128°.

Anal. Calcd for C$_{12}$H$_9$ClN$_4$: C, 58.90; H, 3.71; Cl, 14.49; N, 22.90 Found: C, 58.93; H, 3.87; Cl, 14.58; N, 23.07.

EXAMPLE 9

Preparation of 5,6-Dihydro-11-methyl-11H-pyrimido[4,5-b][1,4]benzodiazepine (28)

Method A. A solution of 6-chloro-11-methyl11H-pyrimido[4,5-b][1,4]benzodiazepine (1.71 g, 0.007 mole) and triethylamine (0.709 g, 0.007 mole) in ethyl acetate (100 ml) containing 10% Pd-C (0.8 g) was shaken with hydrogen at an initial pressure of 3.5 kg/cm$^2$ until the uptake of hydrogen ceased. The reaction mixture was filtered and the filtrate reduced to dryness to leave 5,6-dihydro-11-methyl-11H-pyrimido[4,5-b][1,4]benzodiazepine (1.35 g, 92.5%) as a colorless solid, mp 145°–151°. The solid was recrystallized twice from cyclohexane to give colorless crystals, mp 155°–157°.

Anal. Calcd for C$_{12}$H$_{12}$N$_4$: C, 67.90; H, 5.70; N, 26.40. Found: C, 67.87; H, 5.77; N, 26.54.

Method B — Diborane in THF [tetrahydrofuran] (4.12 ml of 0.5 M, 0.00206 mole of diborane) was added to a cooled (ice-water), stirred mixture of 11-methyl-11H-pyrimido[4,5b][1,4]benzodiazepin-6-(5H)-one (0.466 g, 0.00206 mole) in THF (25 ml) under nitrogen. The mixture was stirred at 25° for 15 minutes. The yellow solution was heated under reflux for one hour and then allowed to stand at 25° for 18 hours. To the cooled (ice-water) stirred mixture was added 6N HCl (10ml). Stirring with cooling was continued for 15 minutes, then the mixture was heated under reflux for 10 minutes. The THF was removed. The residual aqueous solution was diluted with water, treated with activated charcoal, and filtered. The filtrate was made basic with 5N NaOH and extracted with methylene chloride. The extract was washed successively with water and saturated aqueous sodium chloride, dried (Na$_2$SO$_4$) and concentrated. The residue was recrystallized from cyclohexane to give 5,6-dihydro-11-methyl-11H-pyrimido[4,5-b][1,4]benzodiazepine (0.129 g, 30%), mp 145°–152°.

EXAMPLE 10

Preparation of 8-Chloro-5,6-dihydro-11methyl-11H-pyrimido[4,5-b][1,4]benzodiazepine (29).

Diborane in THF (7.7 ml of 0.5M, 0.00385 mole of diborane) was added to a stirred, cooled (ice-water) mixture of 8-chloro-11-methyl-11H-pyrimido-[4,5-b][1,4]-benzodiazepine-6(5H)-one (1.0 g, 0.00384 mole) in THF (50 ml). The mixture was stirred at 25° for 0.5 hour and then heated under reflux for 1.25 hours. The cooled (ice-water) mixture was treated with 6N HCl (15 ml) and then stirred at 25° for 15 minutes. The solution was heated under reflux for 10 minutes. The THF was removed, the solution was filtered, and the filtrate made basic with 5N NaOH. The precipitated solid was crystallized from benzene to give 8-chloro-5,6-dihydro-11-methyl-11H-pyrimido[4,5-b][1,4]-benzodiazepine (0.34 g, 36%), mp 196.5°–198.5°. Recrystallization from methanol gave product with mp 200°–202°.

Anal. Calcd for C$_{12}$H$_{12}$ClN$_4$: C, 58.42; H, 4.49; Cl, 14.37; N, 22.71. Found: C, 58.68; H, 4.68; Cl, 13.95; N, 22.87.

EXAMPLE 11

Preparation of 6-Dimethylamino-11-methyl-11H-pyrimido[4,5-b][1,4]benzodiazepine (30)

Dimethylamine (2.36 g, 0.0524 mole) was added to a cold (ice-water) mixture of 6-chloro-11-methyl-11H-pyrimido[4,5-b][1,4]benzodiazepine (3.2 g, 0.0131 mole) in benzene contained in a pressure bottle. The bottle was heated on a steam bath for 1 hour and was then allowed to stand at 25° for 17 hours. The reaction mixture was filtered and the filtrate reduced to dryness. The residual yellow solid was recrystallized from Skellysolve B to give 6-dimethylamino-11-methyl-11H-pyrimido[4,5-b][1,4]benzodiazepine (3.3 g, 100%), mp 119.5°–122°. The product was recrystallized from Skelly-solve B to give yellow needles, mp 119°–121°.

Anal. Calcd for C$_{14}$H$_{15}$N$_5$: C, 66.38; H, 5.97; N, 27.65. Found: C, 66.49; H, 6.05; N, 27.99.

EXAMPLE 12

Preparation of 6Cyclopropylamino-11-methyl-11H-pyrimido[4,5-b][1,4]benzodiazepine (31)

A mixture of 6-chloro-11methyl-11H-pyrimido[4,5-b][1,4]benzodiazepine (1.5 g) and cyclopropylamine (3 ml) was heated under reflux for 1.25 hours. The reaction mixture was reduced to dryness. The residue was treated with water and the mixture filtered. The collected 6-cyclopropylamino-11-methyl-11H-pyrimido[4,5-b][1,4]benzodiazepine (1.54 g, 94.5%), mp 268°–270°, was recrystallized twice from methyl isobutyl ketone to give yellow crystals, mp 266°–267.5°.

Anal. Calcd for C$_{15}$H$_{15}$N$_5$: C, 69.90; H, 5.70; N, 26.40. Found: C, 68.31; H, 5.90; N, 26.44

EXAMPLE 13

Preparation of 6-Benzylamino-11-methyl-11H-pyrimido[4,5][1,4]benzodiazepine (32)

A mixture of 6-chloro-11methyl-11H-pyrimido[4,5-b][1,4]benzodiazepine (1.5 g, 0.00612 mole) and benzylamine (2.3 g, 0.0215 mole) in benzene (40 ml) was heated under reflux for 5 hours and was then allowed to stand at 25° for 5 days. The reaction mixture was filtered to give solid A and filtrate B. Solid A (2.0 g) was washed with water to leave yellow crystals (1.47 g), mp 247°–249°. Filtrate B was washed with water and reduced to dryness. The residual solid (0.7 g) was recrystallized from toluene to give yellow crystals (0.32 g), mp 245°–247.5°. The combined product (1.79 g, 93%)

was recrystallized from toluene to give 6-benzylamino-11-methyl-11H-pyrimido[4,5-b][1,4]-benzodiazepine as pale yellow crystals, mp 245°–247°.

Anal. Calcd for $C_{19}H_{17}N_5$: C, 72.36; H, 5.43; N, 22.21. Found C, 72.16; H, 5.44; N, 22.37.

EXAMPLE 14

Preparation of 6-(2-Dimethylaminoethylamino)-11-methyl-11H-pyrimido[4.5-b][1,4]benzodiazepine (33)

A solution of 6-chloro-11-methyl-11H-pyrimido-[4,5-b][1,4]benzodiazepine (2.0 g, 0.00818 mole) and 2-dimethylaminoethylamine (1.44 g, 0.0164 mole) in benzene (80 ml) was heated under reflux for 4 hours. The mixture was filtered and the filtrate reduced to dryness. The residual solid was recrystallized from cyclohexane to give 6-(2-dimethylaminoethylamino)-11-methyl-11H-pyrimido[4,5-b][1,4]benzodiazepine (2.23 g, 92%), mp 161°–164°. The product was recrystallized from cyclohexane to give pale yellow crystals, mp 162°–163.5°.

Anal. Calcd for $C_{16}H_{20}N_6$: C, 64.84; H, 6.80, N, 28.36. Found: C, 64.65; H, 6.95; ; N, 28.64.

EXAMPLE 15

Preparation of 5,6-Dihydro-5,11-dimethyl-11H-pyrimido[4,5-b][1,4]benzodiazepine Hydrochloride (34).

Sodium hydride (1.1 g of a 57% sodium hydride dispersion in mineral oil, 0.0262 mole of sodium hydride) was added to a stirred solution of 5,6-dihydro-11-methyl-11H-pyrimido[4,5-b][1,4]benzodiazepine (5.07 g, 0.0242 mole) in DMF (50 ml) under nitrogen. The stirred mixture was then heated by means of an oil bath maintained at 75°–80° for 1 hour. The solution was cooled to 5°. A solution of methyl p-toluenesulfonate (4.88 g, 0.0262 mole) in DMF (5 ml) was added dropwise over a period of 5 minutes. The stirred mixture was heated by means of an oil bath maintained at 60° for 1 hour and was then kept at 25° for 18 hours. The reaction mixture was concentrated and the residue partitioned between ethyl acetate and water. The ethyl acetate layer was washed with water followed by saturated aqueous sodium chloride, dried ($Na_2SO_4$), and concentrated. The residue was extracted with boiling Skellysolve B. The extract was concentrated and the residue chromatographed on alumina (200 g) with toluene-acetone-diethylamine (10:1:0.02). The product was recrystallized from Skellysolve B to give yellow crystals (2.16 g), mp 91°–93°. This product was dissolved in an equivalent of 1N HCl. The solution was reduced to dryness. The residual solid was recrystallized from ethanol to give 5,6-dihydro-5,11-dimethyl-11H-pyrimido[4,5][1,4]-benzodiazepine hydrochloride as yellow crystals (2.2 g, 34.55), mp 253°–257° (decomp).

Anal. Calcd for $C_{13}H_{14}N_4 \cdot HCl$: C, 59,42; H, 5.75; Cl, 13.49; N, 21.82. Found C, 59.28; H, 5.90; Cl, 13.65; N, 21.62.

EXAMPLE 16

Preparation of Ethyl 4-(N-Methylanilino)pyrimidine-5-carboxylate (35)

A solution of N-methylaniline (6.9 g, 0.0645 mole) and ethyl 4chloropyrimidine-5-carboxylate (6.0 g, 0.0323 mole) in benzene (35 ml) was heated under reflux for 2 hours. The mixture was allowed to stand at room temperature overnight. The mixture was filtered and filtrate concentrated. The residue was chromatographed on alumina (250 g) with benzene-chloroform to give a brown oil which was distilled at 140°–142° (0.1 mm) to give a pale yellow oil which crystallized on standing. The product was recrystallized from Skellysolve B to give ethyl 4-(N-methylanilino)pyrimidine-5-carboxylate (0.825 g) as colorless crystals, mp 72°–73°.

Anal. Calcd for $C_{14}H_{15}N_3O_2$: C, 65.35; N, 5.88; N, 16.33. Found: C, 65.20; H, 5.82; N, 16.45.

EXAMPLE 17

Preparation of 4-(N-Methylanilino)pyrimidine-5-carboxylic Acid (36)

A solution of ethyl 4-(N-methylanilino)-pyrimidine-5-carboxylate (2.0 g) and potassium hydroxide (2.5 g) in ethanol (20 ml) and water (5 ml) was heated under reflux for 3.5 hours. Removal of the ethanol and acidification with hydrochloric acid gave a solid which was recrystallized from acetone to give 4-(N-methylanilino)pyrimidine-5-carboxylic acid (0.80 g), mp 210°–212°. Recrystallization from acetone gave colorless crystals, mp 212°–213°.

Anal. Calcd for $C_{12}H_{11}N_3O_2$: C, 62.87; H, 4.84; N, 18.33. Found: C, 62.80; H, 4.93; N, 18.45.

EXAMPLE 18

Preparation of 11-Methyl-11H-pyrimido[4,5-b][1,4]-benzodiazepin-6(5H)-one (24)

Triethylamine (0.6 ml, 0.00422 mole) was added to a stirred mixture of 4-(N-methylanilino)pyrimidine-5-carboxylic acid (0.966 g, 0.00422 mole) in THF (15 ml). The resulting solution was cooled in an ice-NaCl bath. Ethyl chloroformate (0.457 g, 0.00422 mole) was added and the mixture stirred with cooling for 0.5 hr. With continued stirring and cooling, a solution of sodium azide (0.550 g, 0.00844 mole) in water (50 ml) was added over a period of 1 hour. The mixture was diluted with water and extracted with methylene chloride. The methylene chloride solution was dried ($Na_2SO_4$) and concentrated. A solution of the residue in 1,1,2,2-tetrachloroethane was heated on a steam bath until the evolution of nitrogen ceased. This solution was then added over a period of 0.5 hour to a stirred mixture of aluminum chloride (0.0025 mole) in 1,1,2,2-tetrachloroethane (3 ml) at 90°–95°. The mixture was stirred for an additional 1 hour at 90°–95°. The cooled mixture was poured into a mixture of 1 N HCl (4 ml) and water (10 ml). The organic layer was dried ($Na_2SO_4$) and concentrated. The residual solid was sublimed at 200° (0.1 mm). The product was recrystallized from ethanol to give 11-methyl-11H-pyrimido[4,5-b][1,4]benzodiazepin-6(5H)-one (30 mg) as colorless crystals, mp 281°–283°.

EXAMPLE 19

Preparation of Methyl N-Benzyl-N-(6-chloro-5-nitro-4-pyrimidinyl)anthranilate (38).

Sodium hydride (0.405 g of a 59.4% sodium hydride dispersion in mineral oil, 0.01 mole sodium hydride) was added to a cooled (ice-water), stirred suspension of methyl N-(6-chloro-5-nitro-4-pyrimidinyl) anthranilate (3.08 g, 0.01 mole) in diglyme (25 ml). The mixture was stirred for 20 minutes with cooling followed by 40 minutes at 25°. Benzyl iodide (2.18 g, 0.01 mole)

was then added to the cooled (ice-water) mixture, and stirring was continued for 18 hours while the temperature of the reaction mixture was allowed to slowly rise to 25°. The reaction mixture was filtered and concentrated. The residue was treated with methylene chloride (200 ml), water (100 ml) and glacial acetic acid (1 ml). The methylene chloride layer was washed with water, dried ($Na_2SO_4$), and concentrated. The residue was extracted with boiling cyclohexane (2 × 150 ml). The extracts were reduced in volume and allowed to cool. The crystalline product (2.54 g, 64%) was recrystallized twice from cyclohexane to give methyl N-benzyl-N-(6-chloro-5-nitro-4-pyrimidinyl)anthranilate as yellow crystals, mp 112°–113.5°.

Anal. Calcd for $C_{19}H_{15}ClN_4O_4$: C, 57.22; H, 3.79; Cl, 8.89; N, 14.05. Found: C, 57.36; H, 3.80; Cl, 9.02; N, 14.14.

EXAMPLE 20

Preparation of Methyl N-(5-Amino-4-pyrimidinyl)-N-benzylanthranilate (39)

A solution of methyl N-benzyl-N-(6-chloro-5-nitro-4-pyrimidinyl)anthranilate (2.08 g, 0.00522 mole) and triethylamine (0.527 g, 0.00522 mole) in ethyl acetate (100 ml) containing 10% Pd-C (0.5 g) was shaken with hydrogen at an initial pressure of 3.5 kg/cm² until the uptake of hydrogen ceased. The reaction mixture was filtered. The filtrate was concentrated to leave methyl N-(5-amino-4-pyrimidinyl)-N-benzylanthranilate as a viscous oil. The product was characterized as a hydrobromide salt (1.8 g, 83%) which was recrystallized from acetonitrile followed by methanol-ether to give colorless crystals, mp 189°–190° (decomp).

Anal. Calcd for $C_{19}H_{18}N_4O_2 \cdot HBr$: C, 54.95; H, 4.61; N, 13.49; Br, 19.24. Found: C, 54.94; H, 4.76; N, 13.68; Br, 19.43.

EXAMPLE 21

Preparation of 11-Benzyl-11H-pyrimido[4,5-b][1,4]-benzodiazepin-6(5H)-one (40)

A flask containing methyl N-(5-amino-4-pyrimidinyl)-N-benzylanthranilate (8.85 g) was placed in an oil bath maintained at 160°–185° for 15 minutes. The solid product was cooled, triturated with cold methylene chloride, and the mixture filtered. The collected solid (5.9 g, 74%), mp 242.5°–244.5° was recrystallized from ethanol to give 11-benzyl-11H-pyrimido[4,5-b][1,4]benzodiazepin-6(5H)-one as colorless plates, mp 242.5°–244°.

Anal. Calcd for $C_{18}H_{14}N_4O$: C, 71.51; H, 4.67; N, 18.53. Found: C, 71.27; H, 4.52; N, 18.63.

EXAMPLE 22

Preparation of 11-Benzyl-6-chloro-11H-pyrimido[4,5-b][1,4]benzodiazepine (41)

A mixture of 11-benzyl-11H-pyrimido[4,5-b][1,4]benzodiazepin-6(5H)-one (9.25 g) and $POCl_3$ (90 ml) was heated under reflux for 0.75 hour. The reaction mixture was concentrated and a methylene chloride solution (200 ml) of the residue was poured onto a stirred mixture of concentrated $NH_4OH$ (25 ml), methylene chloride (100 ml), and ice (75 g). Stirring was continued for 10 minutes, the temperature of the mixture being maintained at 10°–15°. The methylene chloride layer was washed with cold water (3 × 100 ml) followed by saturated aqueous sodium chloride. The methylene chloride solution was then dried ($Na_2SO_4$) and concentrated. The residual froth was chromatographed on basic alumina (200 g) with toluene-acetone (50:1) to give a yellow solid. The solid was washed with a small volume of cold n-pentane to give 11-benzyl-6-chloro-11H-pyrimido [4,5-6][1,4]-benzodiazepine (6.6g, 67%), mp 109°–112°. The product was recrystallized from Skellysolve B to give yellow crystals, mp 111.5°–113°.

Anal. Calcd for $C_{18}H_{13}ClN_4$: C, 67.39; H, 4.08; Cl, 11.05; N, 17.47. Found: C, 67.03, H, 4.28; Cl, 11.12; N, 17.36.

EXAMPLE 23

Preparation of 11-Benzyl-5,6-dihydro-11H-pyrimido-[4,5-b][1,4]benzodiazepine (42)

A solution of 11-benzyl-6-chloro-11H-pyrimido[4,5-b][1,4]benzodiazepine (5.7 g, 0.0178 mole) and triethylamine (2.0 g, 0.0198 mole) in ethyl acetate (200 ml) containing 10% Pd-C (1.0 g) was shaken with hydrogen at an initial pressure of 3.5 kg/cm² until the uptake of hydrogen ceased. The reaction mixture was filtered and the filtrate concentrated to leave a yellow solid (5.0 g). The solid was recrystallized from Skellysolve C to give 11-benzyl-6,-dihydro-11H-pyrimido[4,5-b][1,4]benzodiazepine (4.2 g, 83.5%) as buff crystals, mp 118.5°–119.5°.

Anal. Calcd for $C_{18}H_{16}N_4$: C, 74.97; H, 5.59; N, 19.43. Found: C, 74.94; H, 5.74; N, 19.14.

EXAMPLE 24 (

Preparation of 8-Chloro-5,11-dimethyl-11H-pyrimido-[4,5-b][1,4]benzodiazepin-6(5H)-one (43)

Sodium hydride (0.638 g of a 57% sodium hydride dispersion in mineral oil, 0.01516 mole of sodium hydride) was added to a stirred, cooled (ice-water) mixture of 8-chloro-11-methyl-11H-pyrimido[4,5-b][1,4]benzodiazepin-6(5H)-one (3.59 g, 0.01378 mole in DMF (30 ml) under nitrogen. The mixture was then maintained at 50° until hydrogen evolution ceased (ca. 0.5 hour). Methyl p-toluenesulfonate (2.84 g, 0.0152 mole) in DMF (5 ml) was added to the cooled (ice-water), stirred solution. The resulting solution was then heated by means of an oil bath maintained at 105° for 3 hours. The reaction mixture was concentrated and the residue treated with ice-water. The solid was collected, washed with water, and dried. The product was recrystallized from cyclohexane to give 8-chloro-5,11-dimethyl-11H-pyrimido[4,5-b][1,4]benzodiazepin-6-(5H)-one (2.5 g, 66%) as pale yellow crystals, mp 165°–168°. Recrystallization from cyclohexane gave pale yellow crystals, mp 166°–168°.

Anal. Calcd for $C_{13}H_{11}ClN_4O$: C, 56.84; H, 4.04; Cl, 12.91; N, 20.39. Found: C, 56.75; H, 4.14; Cl, 12.82; N, 20.72.

EXAMPLE 25

Preparation of 8-Chloro-5,6-dihydro-5,11-dimethyl-11H-pyrimido[4,5-b][1,4]benzodiazepine (44)

Sodium hydride (0.316 g of a 57% sodium hydride dispersion in mineral oil, 0.00749 mole sodium hydride) was added to a stirred solution of 8-chloro-5,6-dihydro-11-methyl-11H-pyrimido[4,5-b][1,4]benzodiazepine (1.68 g, 0.00681 mole) in DMF (20 ml) under nitrogen. The stirred mixture was heated by means of an oil bath maintained at 80°–90° for 1 hour. The stirred solution was cooled (ice-water). A solution of methyl p-toluenesulfonate (1.39 g, 0.00749 mole) in DMF (3 ml) was then added. The resulting solution was stirred for 2 hours at 55° followed by 16 hours at room temperature. The reaction mixture was concentrated and the residue treated with ice-water. The collected solid (1.8 g), mp 110°-120°, was chromatographed on basic alumina (100 g) with toluene-acetone (10:1) containing 1% diethylamine to give 8-chloro-5,6-dihydro-5,11-dimethyl-11H-pyrimido[4,5-b][1,4] benzodiazepine (1.31 g, 74%) as yellow crystals, mp 128°-131°. Recrystallization from Skellysolve B gave product as pale yellow plates, mp 132°-134°.

Anal. Calcd for $C_{13}H_{13}ClN_4$: C, 59.89; H, 5.03; Cl, 13.60; N, 21.49. Found: C, 60.19; H, 5.17; Cl, 13.68; N, 21.87.

EXAMPLE 26

Preparation of Benzyl N-(4-Ethoxy-5-pyrimidinyl)carbamate (45)

Diphenylphosphoryl azide (137.6 g, 0.50 mole) was added to a stirred solution of 4-ethoxypyrimidine-5-carboxylic acid (84.1 g, 0.50 mole), triethylamine (50.5 g, 0.50 mole) and benzyl alcohol (59.5 g, 0.55 mole) in 1,4-dioxane (1 litre) at 25°. The stirred solution was heated until a moderate exothermic reaction set in, with gaseous evolution. External heating was stopped until the reaction had subsided. The solution was then heated under reflux for 1 hour. The solution was concentrated. A solution of the residue in toluene was washed successively with 1N HCl, water, aqueous $NaHCO_3$, and saturated aqueous NaCl. The solution was dried ($Na_2SO_4$) and concentrated. The residue was recrystallized from Skellysolve B to give benzyl N-(4-ethoxy-5-pyrimidinyl)carbamate (89.2 g, 65%) as pale yellow crystals, mp 97°-100°. An analytical sample had mp 97°-99°.

Anal. Calcd for $C_{14}H_{15}N_3O_3$: C, 61.53; H, 5.53; N, 15.38. Found: C, 61.38; H, 5.77; N, 15.32.

EXAMPLE 27

Preparation of 5-Amino-4-ethoxypyrimidine (46)

A solution of benzyl N-(4-ethoxy-5-pyrimidinyl)carbamate (30.5 g, 0.112 mole) in ethanol (200 ml) containing 10% Pd-C (4.5 g) was shaken with hydrogen at an initial pressure of 3.5 kg/cm² for 2 hours. The catalyst was removed by filtration and the filtrate concentrated to leave 5-amino-4-ethoxypyrimidine (15.4 g, 99%) as a pale yellow oil.

EXAMPLE 28

Preparation of 4-Ethoxy-5-(o-nitrobenzalamino)pyrimidine (48)

A solution of 5-amino-4-ethoxypyrimidine (15.1 g, 0.108 mole) and o-nitrobenzalehyde (16.4 g, 0.108 mole) in benzene (125 ml) containing p-toluenesulfonic acid (1.0 g) was heated under reflux for one hour, with water being removed as it was formed. The reaction solution was reduced in volume. From the solution was obtained 4-ethoxy-5-(o-nitrobenzalamino)pyrimidine (25.5 g, 86.6%) by crystallization. Recrystallization of the product from cyclohexane gave yellow needles, mp 131°-133.5°.

Anal. Calcd for $C_{13}H_{12}N_4O_3$: C, 57.35; H, 4.44; N, 20.58. Found: C, 57.34; H, 4.39; N, 20.89.

EXAMPLE 29

4-Ethoxy-5-(o-nitrobenzylamino)pyrimidine (50)

Diborane in THF (57 ml of 0.5 M, 0.0285 mole of diborane) was added over a period of 10 minutes to a cooled (ice-water), stirred mixture of 4-ethoxy-5-(o-nitrobenzalamino)pyrimidine (15.5 g, 0.057 mole) in THF (200 ml) under nitrogen. The mixture was stirred at 5°-25° for 30 minutes and then heated under reflux for 1 hour. The mixture was cooled and cautiously treated with 6N HCl (170 ml). When the vigorous gaseous evolution had ceased, the solution was heated under reflux for 15 minutes. Most of the THF was removed and the aqueous solution made strongly basic with NaOH. The precipitated material was extracted into ethyl acetate-diethyl ether (2:1). The organic layer was washed with water followed by saturated aqueous sodium chloride, dried ($Na_2SO_4$), and concentrated. The sticky crystalline product was recrystallized from cyclohexane followed by nitromethane to give 4-ethoxy-5-(o-nitrobenzylamino)pyrimidine (10.5 g, 67%) as yellow crystals, mp 124.5°-126.5°. Recrystallization from nitromethane gave bright yellow crystals, mp 125°-126.5°.

Anal. Calcd for $C_{13}H_{14}N_4O_3$: C, 56.93; H, 5.15; N, 20.43. Found: C, 57.00; H, 5.04; N, 20.81.

EXAMPLE 30

Preparation of 5-(o-Aminobenzylamino)-4-ethoxypyrimidine (51)

A mixture of 4-ethoxy-5-(o-nitrobenzylamino)pyrimidine (7.21 g) and 10% Pd-C (1.5 g) in ethanol (100 ml) was shaken with hydrogen at an initial pressure of 3.5 kg/cm² until hydrogen uptake had ceased. The mixture was filtered and the filtrate concentrated. The residue was recrystallized from benzene-Skellysolve B to give 5-(o-aminobenzylamino)-4-ethoxypyrimidine (6.0 g, 93.5%) as pale yellow needles, mp 127°-129°. Recrystallization from benzene-Skellysolve B gave pale yellow needles, mp 127°-129°.

Anal. Calcd for $C_{13}H_{16}N_4O$: C, 63.91; H, 6.60; N, 22.94. Found: C, 63.94; H, 6.82; N, 23.25.

EXAMPLE 31

Preparation of 5,6-Dihydro-11H-pyrimido[4,5-b][1,4]benzodiazepine (52)

Sodium hydride (0.745 g of 57% NaH dispersion in mineral oil, 0.0177 mole of NaH) was added to a stirred solution of 5-(o-aminobenzylamino)-4-ethoxypyrimidine (3.81 g, 0.0156mole) in hexamethylphosphoramide (HMPA, 20 ml) at 25° under nitrogen. The mixture was heated, with stirring, by means of an oil bath maintained at 100°-110° for one hour. The mixture was then stirred at 30° for 18 hours under nitrogen. About two-thirds of the HMPA was removed under vacuum. The gummy residue was treated with ice and water. The resulting solid was washed with cold water and dried. The solid (3.2 g) was recrystallized from toluene to give 5,6-dihydro-11H-pyrimido [4,5-b][1,4]benzodiazepine (2.2 g, 71%), mp 140°-142°. Recrystallization from toluene gave the product as pale salmon crystals, mp 140°-141°.

Anal. Calcd. for $C_{11}H_{10}N_4$: C, 66.65; H, 5.09; N, 28.26. Found: C, 66.94; H, 5.37; n, 28.56.

THF is tetrahydrofuran.
DMS is dimethylformamide.
Skellysolve B (Skelly B) is petroleum ether, B.P. 60°-68° C, consisting of essentially n-hexane.

We claim:
1. The compound having the formula

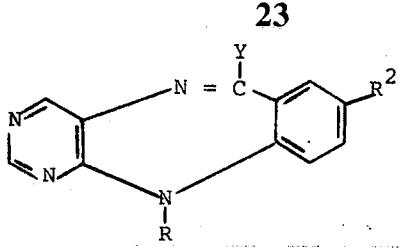

in which Y is di(lower)alkylamino, cyclo(lower)alkylamino, benzylamino, phenethylamino, or di(lower)alkylamino (lower)alkylamino; R is H, (lower)alkyl or a radical of the formula

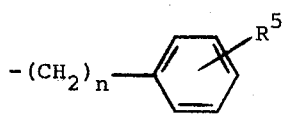

in which $n$ is an integer of 1 to 4 and $R^5$ is chloro, $CF_3$, H, fluoro, bromo, (lower)alkoxy or (lower)alkyl; $R^2$ is H, chloro, bromo, fluoro, (lower)alkyl, $CF_3$, (lower)alkoxy or nitro; or a pharmaceutically acceptable nontoxic salt thereof.

2. The compound of claim 1 wherein R is H, (lower)alkyl, benzyl or phenethyl, $R^2$ is H, and Y is dimethylamino, cyclopropylamino, benzylamino or dimethylaminoethylamino; or a pharmaceutically acceptable, nontoxic salt thereof.

3. The compound of claim 1 wherein R is methyl, $R^2$ is H and Y is dimethylamino, cyclopropylamino, benzylamino or dimethylaminoethylamino; or a pharmaceutically acceptable, nontoxic salt thereof.

4. The compound of claim 1 wherein Y is cyclopropylamino, R is methyl and $R^2$ is H.

* * * * *